United States Patent
Ji et al.

(10) Patent No.: US 9,420,603 B2
(45) Date of Patent: Aug. 16, 2016

(54) RECOVERY FROM RESOURCE MISMATCH IN A WIRELESS COMMUNICATION SYSTEM

(75) Inventors: Tingfang Ji, San Diego, CA (US); Mohammad Jaber Borran, San Diego, CA (US); Alexei Gorokhov, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1683 days.

(21) Appl. No.: 11/849,646

(22) Filed: Sep. 4, 2007

(65) Prior Publication Data

US 2008/0123520 A1    May 29, 2008

Related U.S. Application Data

(60) Provisional application No. 60/843,154, filed on Sep. 8, 2006.

(51) Int. Cl.
    *H04W 72/12*    (2009.01)

(52) U.S. Cl.
    CPC .................. *H04W 72/1252* (2013.01)

(58) Field of Classification Search
    CPC .................................. H04W 72/1252
    See application file for complete search history.

(56) References Cited

U.S. PATENT DOCUMENTS

| | | | |
|---|---|---|---|
| 4,763,322 A | 8/1988 | Eizenhofer | |
| 5,535,238 A * | 7/1996 | Schilling et al. | 375/142 |
| 5,602,833 A | 2/1997 | Zehavi | |
| 5,727,033 A * | 3/1998 | Weaver | H04W 52/12 375/358 |
| 5,914,950 A | 6/1999 | Tiedemann, Jr. et al. | |
| 6,219,342 B1 * | 4/2001 | Rege | 370/318 |
| 6,246,880 B1 | 6/2001 | Iizuka | |
| 6,542,736 B1 * | 4/2003 | Parkvall | H04W 28/20 370/465 |
| 6,657,980 B2 | 12/2003 | Holtzman et al. | |
| 6,901,063 B2 | 5/2005 | Vayanos et al. | |
| 6,947,750 B2 | 9/2005 | Kakani et al. | |
| 7,372,834 B2 * | 5/2008 | Kim et al. | 370/331 |
| 8,224,368 B2 * | 7/2012 | Leonard | 455/522 |
| 2004/0030992 A1* | 2/2004 | Moisa | G06Q 10/10 715/234 |

(Continued)

FOREIGN PATENT DOCUMENTS

| | | |
|---|---|---|
| CN | 1753515 | 3/2006 |
| EP | 1335505 A1 | 8/2003 |

(Continued)

OTHER PUBLICATIONS

Gang et al.; The design of pilot strength analysis function to soft handoff in CDMA systems; 1999 IEEE TENCON; pp. 1186-1189.*

(Continued)

*Primary Examiner* — Ajay Cattungal
(74) *Attorney, Agent, or Firm* — Dalei Dong

(57) ABSTRACT

System(s) and method(s) that facilitate assignment mismatch recovery are provided. A projected level of resources required to satisfy one or more communication constraints (e.g., inter-cell and intra-cell interference) is generated. The projected resources are contrasted with scheduled resources and a determination is made as to whether a mismatch between assigned and projected resources exists. A mismatch is recovered through an adaptive response that feeds back magnitudes for the communication resources which are compatible with the communication constraints.

58 Claims, 14 Drawing Sheets

(56) References Cited

U.S. PATENT DOCUMENTS

| | | |
|---|---|---|
| 2004/0085909 A1 | 5/2004 | Soliman |
| 2004/0151122 A1 | 8/2004 | Lau et al. |
| 2005/0124347 A1* | 6/2005 | Hosein ................... 455/446 |
| 2005/0268114 A1 | 12/2005 | Thibadeau |
| 2006/0045117 A1 | 3/2006 | Qi et al. |
| 2006/0133312 A1 | 6/2006 | Harrison Teague et al. |
| 2006/0166691 A1* | 7/2006 | Medrano ................... 455/522 |
| 2006/0285479 A1* | 12/2006 | Han ................ H04B 7/0678 370/203 |
| 2007/0002728 A1* | 1/2007 | Fujii ................ H04L 25/0206 370/210 |
| 2007/0091836 A1* | 4/2007 | Oprescu-Surcobe H04W 52/0225 370/318 |
| 2007/0223364 A1* | 9/2007 | Terabe ................ H04L 5/0037 370/208 |
| 2008/0031152 A1* | 2/2008 | Tseng ................ H04L 12/2602 370/252 |

FOREIGN PATENT DOCUMENTS

| | | |
|---|---|---|
| GB | 2316275 A | 8/1997 |
| JP | H10510122 A | 9/1998 |
| JP | 10341474 A | 12/1998 |
| JP | 2003532310 A | 10/2003 |
| JP | 2007503159 A | 2/2007 |
| JP | 2007506358 A | 3/2007 |
| RU | 2222107 C2 | 1/2004 |
| WO | 0049824 | 8/2000 |
| WO | WO0120867 A1 | 3/2001 |
| WO | 03001725 | 1/2003 |
| WO | WO2004039011 A2 | 5/2004 |
| WO | WO-2005022770 A1 | 3/2005 |
| WO | WO-2005036895 A2 | 4/2005 |
| WO | WO2006028622 A1 | 3/2006 |

OTHER PUBLICATIONS

Zhang, Jinfang; Soft Hanfoff in MC-CDMA Cellular Networks Supporting Multimedia Services; 2004; PhD. Thesis, University of Waterloo, Ontario, Canada.*

International Search Report—PCT/US2007/077670, International Searching Authority—European Patent Office—Apr. 22, 2008.

Written Opinion—PCT/US2007/077670, International Searching Authority—European Patent Office—Apr. 22, 2008.

Translation of Office Action in Chinese application 200780033010.3 corresponding to U.S. Appl. No. 11/849,646, citing WO2006028622 and CN1753515 dated May 3, 2011.

Taiwan Search Report—TW096133599—TIPO—Aug. 17, 2011.

* cited by examiner

RECOVERY FROM RESOURCE MISMATCH IN A WIRELESS COMMUNICATION SYSTEM

CROSS-REFERENCE TO RELATED APPLICATION

This application claims the benefit of U.S. provisional application Ser. No. 60/843,154, filed on Sep. 8, 2006, and entitled "RECOVERY FROM MISMATCH." The entirety of this application is incorporated herein by reference.

BACKGROUND

I. Field

The present disclosure relates generally to wireless communications, and more specifically to techniques for recovering from a resource mismatch in a wireless communication system.

II. Background

Wireless communication has penetrated nearly every aspect of an individual's daily routine. To facilitate work/school activities as well as entertainment, wireless systems are widely deployed and provide various types of communication content such as voice, data, video, and so on. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

A wireless multiple-access communication system can simultaneously support communication for multiple wireless terminals. In such a system, each terminal can communicate with one or more sectors via transmissions on the forward and reverse links. The forward link (or downlink) refers to the communication link from the sectors to the terminals, and the reverse link (or uplink) refers to the communication link from the terminals to the sectors. These communication links can be established via a single-input-single-output (SISO), multiple-input-single-output (MISO), and/or multiple-input-multiple-output (MIMO) systems.

Multiple terminals can simultaneously transmit on the reverse link by multiplexing their transmissions to be orthogonal to one another in the time, frequency, and/or code domain. If full orthogonality between transmissions is achieved, transmissions from each terminal will not interfere with transmissions from other terminals at a receiving sector. However, complete orthogonality among transmissions from different terminals is often not realized due to channel conditions, receiver imperfections, and other factors. As a result, terminals often cause some amount of interference to other terminals communicating with the same sector. Furthermore, because transmissions from terminals communicating with different sectors are typically not orthogonal to one another, each terminal can also cause interference to terminals communicating with nearby sectors. This interference results in a decrease in performance at each terminal in the system, with the ensuing deterioration of quality of service (QoS). In order to preserve QoS, communication need to reconcile interference levels with resources assigned for communication. Accordingly, there is a need in the art for effective techniques to mitigate the effects of interference and assign resources compatible with operational interference levels in a wireless communication system.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In an aspect, it is disclosed herein a method for recovering from a communication resource mismatch that is employed in a wireless communication system, the method comprising: receiving a communication resource assignment; determining a resource mismatch exists between the resource assignment and a projected communication resource level; and responding to the communication resource mismatch with a resource adjustment.

In another aspect disclose herein is a wireless communication apparatus, the system comprising: an integrated circuit configured to receive a resource schedule, to compute a resource projection level and determine a mismatch exists between the scheduled resources and the projected resources, and to recover the resource mismatch; and a memory that is coupled to the integrated circuit and stores data.

In yet another aspect, an apparatus employed in wireless communication that facilitates recovery from resource mismatch, the apparatus comprising: means for establishing a communication resource projection, means for generating an adaptive response to a resource assignment mismatch between the communication resource projection and a scheduled communication resource; and means for transmitting the adaptive response to the resource assignment mismatch.

In still another aspect, a computer-readable medium, comprising: code for causing a computer to compute an open loop estimate of required resources for communicating wirelessly subject to one or more communication constraints; code for causing a computer to receive a resource assignment; code for causing a computer to compare the estimate of required resources for communicating wirelessly subject to one or more communication constraints to the assigned resources, and determining whether said required and assigned resources are mismatched; and code for causing a computer to respond to a resource mismatch by transmitting one or more adjusted resources from the group of assigned resources.

In an aspect, an apparatus that operates in a wireless environment, the apparatus comprising: means for scheduling one or more communication resources; means for adjusting the scheduled communication resources in response to a received communication that conveys an alternative set of communication resources; and means for re-scheduling the set of alternative communication resources.

In another aspect, in a wireless communication system, an apparatus comprising: an integrated circuit configured to assign a set of time-frequency resources, to receive a set of adjusted resources, and to carry out a communication employing an adjusted resource; and a memory that is coupled to the integrated circuit and stores data and algorithms.

In yet another aspect, a method used in a wireless communication system, the method comprising: scheduling a first set of communication resources; receiving a second set of communication resources in response to the first set of scheduled communication resources; and determining whether to re-schedule the first set of communications according to the received second set of resources.

A computer-readable medium, comprising: code for causing a computer to assign a first set of resources for communicating wirelessly; code for causing a computer to re-assign the first set of resources in response to a received communication conveying that the first set of communication resources mismatches a set of projected resources.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
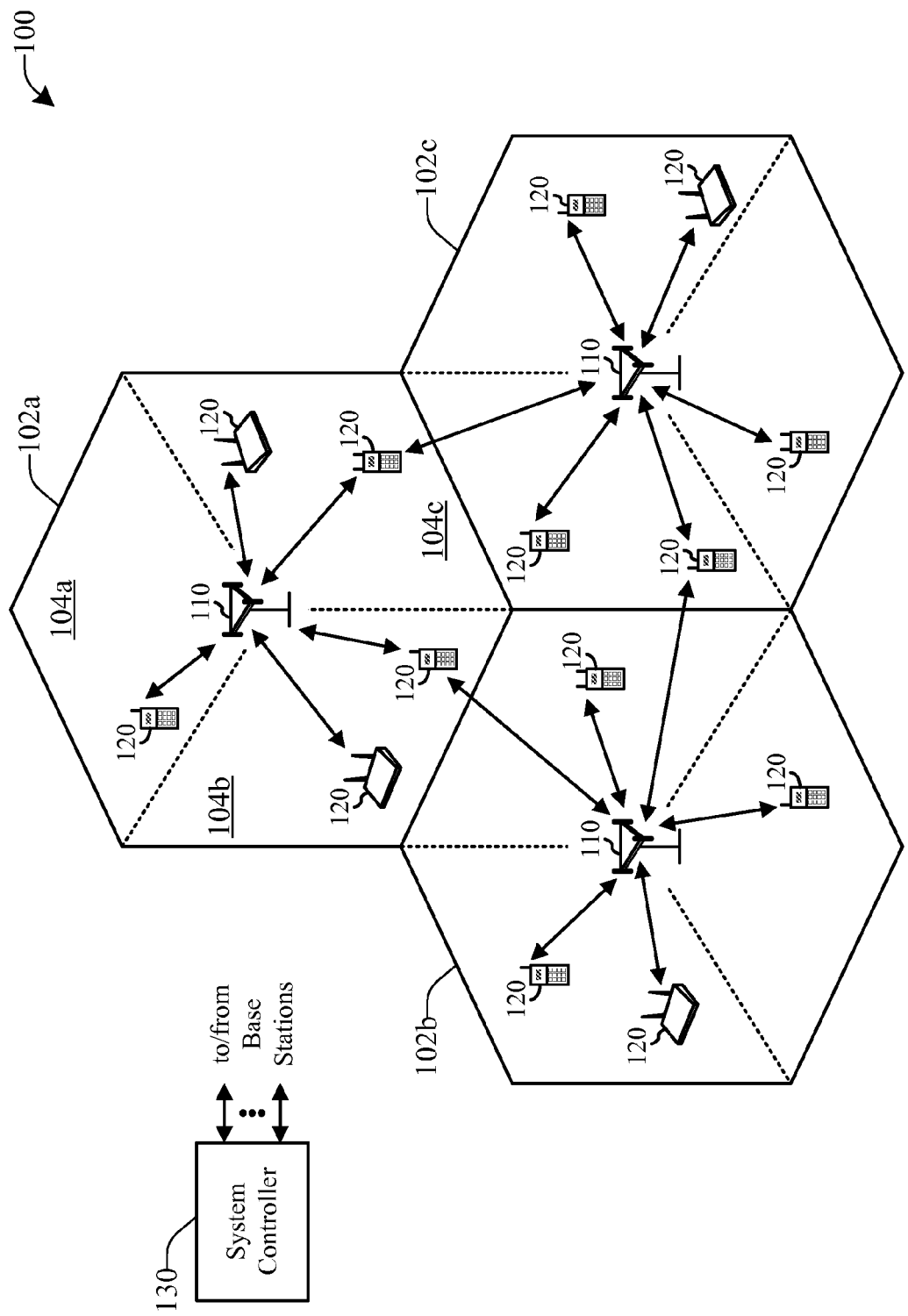
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident; however, that such embodiment(s) may be practiced without these specific details. In other instances, well-known structures and devices are shown in block diagram form in order to facilitate describing one or more embodiments.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, evolved Node B (eNodeB), or some other terminology.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B, and/or another appropriate network entity. Each base station 110 provides communication coverage for a particular geographic area 102a-c. As used herein and generally in the art, the term "cell" can refer to a base station 110 and/or its coverage area 102a-c depending on the context in which the term is used.

To improve system capacity, the coverage area 102a, 102b, or 102c corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. In one example, sectors 104a, 104b, 104c in a cell 102a, 102b, 102c can be formed by groups of antennas (not shown) at base station 110, where each group of antennas is responsible for communication with terminals 120 in a portion of the cell 102a, 102b, or 102c. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. As further used herein, a "serving" access point is one with which a terminal has RL traffic (data) transmissions, and a "neighbor" (non-serving) access point is one with which a terminal can have FL traffic and/or both FL and RL control transmissions but no RL traffic. It should be appreciated that as used herein, a FL sector in a disjoint link scenario is a neighbor sector. While the following description generally relates to a system in which each terminal communicates with one serving access point for simplicity, it should be appreciated that terminals can communicate with any number of serving access points.

In accordance with one aspect, terminals 120 can be dispersed throughout the system 100. Each terminal 120 can be stationary or mobile. By way of non-limiting example, a terminal 120 can be an access terminal (AT), a mobile station, user equipment, a subscriber station, and/or another appropriate network entity. A terminal 120 can be a wireless device, a cellular phone, a personal digital assistant (PDA), a wireless modem, a handheld device, or another appropriate device. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g. data channels not multiplexed using CDM) can be less susceptible to loss in orthogonality due to channel conditions and receiver imperfections than corresponding control channels.

In accordance with an aspect, system 100 can employ centralized scheduling via one or more schedulers implemented at, for example, system controller 130 and/or each base station 110. In a system utilizing centralized scheduling, scheduler(s) can rely on feedback from terminals 120 to make appropriate scheduling decisions. In one example, this feedback can include delta offset added to the OSI information for feedback in order to allow the scheduler to estimate a supportable reverse link peak rate for a terminal 120 from which such feedback is received and to allocate system bandwidth accordingly.

In accordance with another aspect, resource assignment mismatch recovery described hereinafter can be used by system 100 to guarantee minimum system stability and quality of service (QoS) parameters for the system. As an example, decoding error probability of reverse link (RL) acknowledgement messages results in an error floor for all forward link transmissions; such probability can be used to establish a resource projected requirement for a scheduling assignment issued by a base station in a service sector 104. By employing specific mismatch-recovery responses, system 100 can facilitate power efficient transmission of control and QoS traffic and/or other traffic with stringent error requirements.

Figure 2:
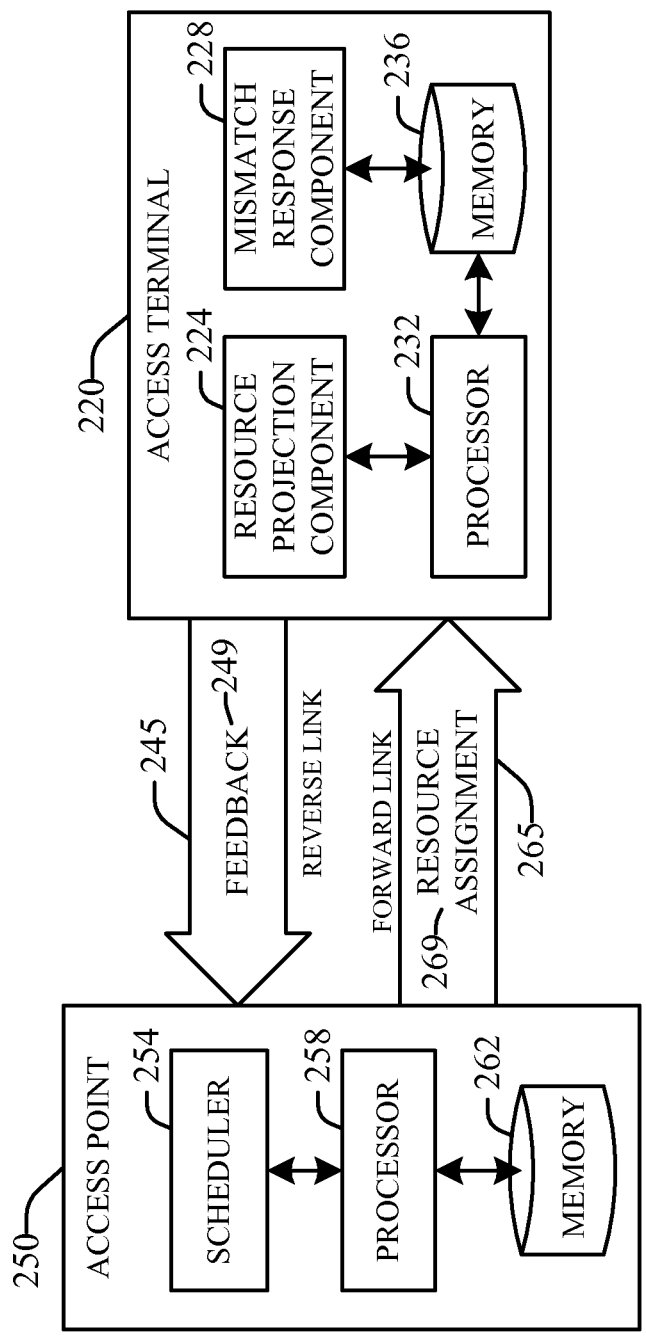
FIG. 2 illustrates a block diagram of an example system that facilitates recovery from resource assignment mismatch.

FIG. 2 illustrates a block diagram of an example system that facilitates recovery from resource assignment mismatch in a wireless system. An access terminal (AT) 220 communicates with a serving access point (AP) 250, which can transmit data and control code symbols to AT 220 over forward link (FL) 265, and can receive data and control through reverse link (RL) 235. In particular, serving AP 250 can communicate a resource assignment to terminal 220. Such resource assignment conveys information on communication resources such as power level and/or power spectral density, packet format, bandwidth, frequency reuse pattern or index, subcarrier assignment, subcarrier spacing, etc., that AT 220 can employ to conduct a communication with AP 250. Resource assignments can be managed by scheduler 254, which can determine assignments based on provider target standards for QoS; energy per bit; traffic load in a serving cell; signal-to-noise ratio (SNR) and signal-to-noise-and-interference ratio (SINR) in the cell; etc. To effect a scheduling decision, scheduler 254 is coupled to a processor 258 that can execute a portion of the scheduling algorithms (such as round robin, fair queuing, maximum throughput, proportional fairness, etc.) adopted by scheduler 254. A memory 262 stores scheduling algorithms, scheduling assignments, and other data relevant to the operation of the scheduler.

Additionally, scheduler 254 can employ feedback information received from AT 220 over RL 235 in order to issue (re-)assignments of resources. In an aspect, feedback information can include an offset value ($\Delta$) in connection with an assigned resource (e.g., power or power spectral density); $\Delta$ can be utilized by scheduler 254 to adjust the resource level and re-assign resources according to such $\Delta$. In such an aspect, AP 220 can access an algorithm, stored in memory 262 and executed by processor 258, to re-compute a level of re-assigned resources. It should be appreciated that such a re-assignment can be employed to mitigate interference caused by AT 220 on other-sector access terminals (not shown): Interference can be mitigated when AP 250 re-assigns a lower operational power to AT 220 in response to receiving a $\Delta$ value. Moreover, resource re-assignment can be effected to turn an access point's communication into a communication compatible with channel conditions, or terminal capabilities, as well as other constraints mentioned supra.

Next, feedback information and its generation as a response to a resource assignment, and utilization as an instrument for recovery from resource assignment mismatch are described. To support the description, and thoroughly explain aspects of the subject innovation, reference is made to illustrative diagrams displayed in FIGS. 3A and 3B, as well as in FIGS. 4A, 4B, and 4C.

Feedback information generation can originate from resource projection component 224 and mismatch response component 228. Prior to a resource assignment, a wireless device, via component 224, can generate a projection of a plurality of resources necessary to (i) meet QoS target standards (e.g., peak data rate, spectral efficiency, latency, capacity); (ii) transmit within a determined bandwidth and a maximum allotted power, with a specific packet format, which can consist of a specific spectral efficiency, packet size, code rate and modulation, and number of steps (or order) of a hybrid automated repeat request (HARQ), and/or within specific channel state conditions—e.g., specific channel quality indicators, such as SNR and SINR, inter-cell and intra-cell interference caused by an operating terminal; and/or (iii) limit the amount of performance loss due to large interference increase originated by bursty users in a partially-loaded cell scenario. In addition, resource projection generation can involve a specific frequency reuse pattern in a multi-sector/cell wireless system (FIG. 1). It should be appreciated that it can be possible to generate a resource projection, via resource projection component 224, with respect to constraints other than (i)-(iii). It should be appreciated that conditions (i)-(iii) can be correlated in a cellular wireless system (FIG. 1), depending on the rate of packet errors or missed reverse link (e.g., RL 245) acknowledgement messages in a neighboring sector: Above certain level of packet errors, with associated full-length HARQ processes, peak data rate and latency can reach levels below target QoS.

Figure 3A:
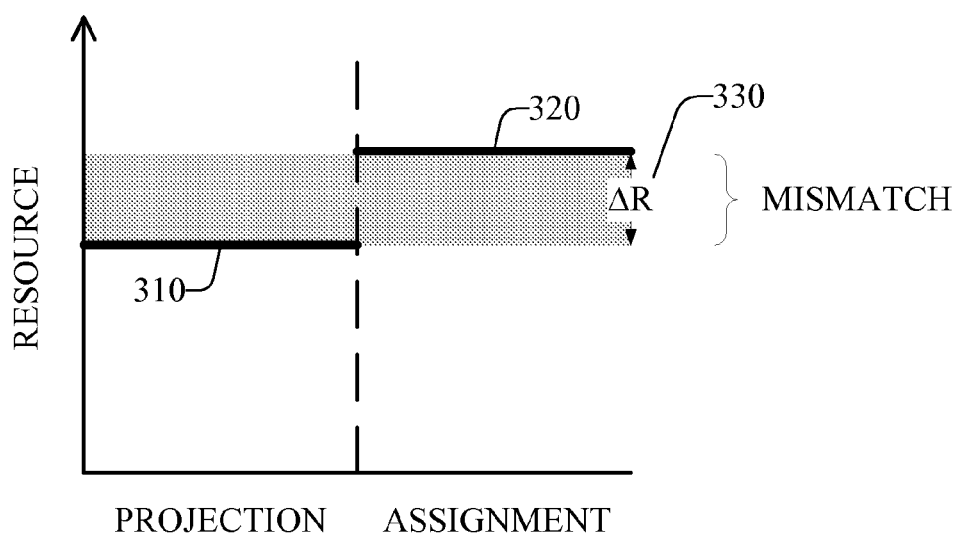
FIGS. 3A and 3B are diagrams that illustrate, respectively, a resource mismatch and an example of a response to the mismatch in accordance with an aspect of the subject disclosure.

FIG. 3A illustrates diagrammatically, in a generalized resource coordinate, a projected resource value 310. It should be appreciated that as a generalized coordinate, a level in the diagram can correspond to a set of projected resource values: In an aspect, such a set can be a code rate R (where $0 < R \leq 1$) and a modulation scheme selected from, e.g., binary phase-shift keying (BPSK), quadrature phase-shift keying (QPSK), multiple phase-shift keying (M-PSK), or M-ary quadrature amplitude modulation (M-QAM); while in another aspect the projected resource value set can correspond to a power level, a bandwidth, and a set of subcarriers in a frequency distributed (interleave) scheduling.

In an aspect, resources related to feature (iii) hereinbefore can typically involve adjusting power output or power spectral density (PSD). It should be appreciated that an access terminal (e.g., AT 220) can also resort to frequency-adaptive interference mitigation (e.g., integral or fractional frequency reuse), wherein the terminal changes the frequency subband (for example, a subband with p tones $\{v_K, v_{K+p}\}$) that employs for communication in order to reduce other-sector interference. In an aspect, such a frequency-adaptive mechanisms can be suited for a sectorized communication (FIG. 1), wherein a multiple-sector, multiple-output smart antenna is utilized by a serving access point (e.g., AP 250) of the terminal resorting to frequency reuse. In such a scenario, beamforming can be employed concurrently with frequency adaptation to attain a desired level of other-sector interference mitigation. Assigned resources described supra such as power, PSD, frequency subband, and antennas available for beamforming can be mismatched with respect to resource projection levels. In such a case, methodologies described hereinafter can be employed to recover from such mismatch.

In order to determine the necessary resources to satisfy predetermined constraints (e.g., (i)-(iii)), resource projection component 224 can apply an open-loop projection to establish a set point for the required resources. Generally, open-loop determinations can generate a reference level (FIG. 3A), or projected resource value, from an input signal and a model response of the system that relies in the open-loop controller, in this case AT 220. In an aspect, the input signal measured by resource projection component 224 is a pilot signal from a serving access point (e.g., AP 250) and a plurality of non-serving sectors. Resource projection component 224, then utilizes the difference in the pilot signal strength between the serving sector and a dominant non-serving sector in the model response to compute the open loop projection. In another aspect, the model response can include an average value of sector/cell interference with respect to thermal noise that an access point can observe. Such an average value can be obtained by estimating the interference power on each subband employed in communication, and computing an average interference power based on the interference power estimates for individual subbands. The average interference power may be obtained using various averaging techniques such as arithmetic averaging, geometric averaging, effective SNR-based averaging, and so on. A processor 232, coupled to resource projection component 224, can conduct a part of all computations necessary to establish the projected, set-point value 310. A memory 236 can retain projected resource levels, averaging algorithms, and other operational data/instructions relevant to the open-loop projection.

Once an access terminal 220 determines a resource projection level 310 and receives a resource assignment 320, terminal 220 can determine whether a mismatch ΔR 330 between projection and assignment exist. It is noted, notwithstanding, that a mismatch may be absent, as it can be possible that the access terminal feeds back projected resource level 310 to a serving access point (e.g., 250), and said AP adopts the projected value at the time of scheduling the assignment. It should be appreciated that a scheduler (e.g., scheduler 254) can determine whether to assign mobile 220 the projected value or a different value based on at least one of several factors, such as resources (e.g., antennas, subcarriers and subbands, power) available for multiple access, traffic load in the cell, expected latency in a communication or application, etc.

Figure 3B:
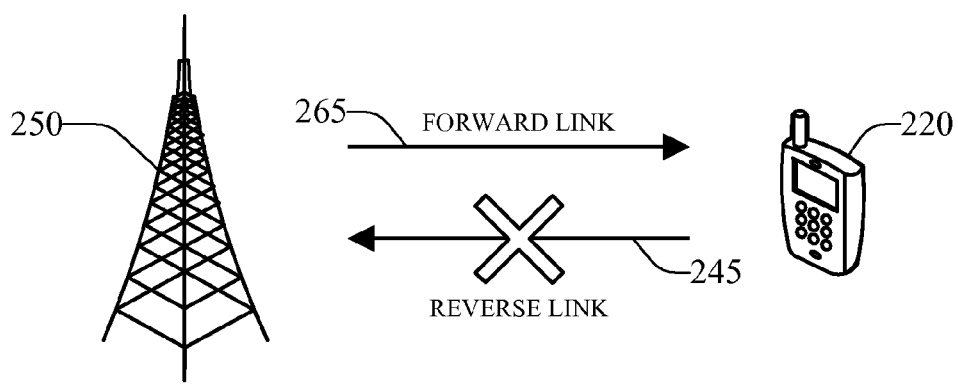

When an access terminal (e.g., AT 220) determines a mismatch exists (e.g., ΔR 330)—for example, if an assigned bandwidth W does not match a resource projection requirement, such as when the assigned W is larger than a $W_{MAX}$ projection for a maximum bandwidth compatible with a PSD constraint or other set of constraints—mismatch response component 228 determines a response. Such a response can be classified into one of at least three categories indicative of the resilience of the communication (as it will become clear in the forthcoming discussion): (a) suppressive, (b) supportive, or (c) adaptive. Suppressive responses result in suspending a communication. As an example, in a suppressive case, component 228 abandons the transmission and loses the assignment of a resource (e.g. bandwidth W in example above). Such a response can result in degradation of a sector's QoS, and in incurring the need to re-acquire a serving cell. Yet, suspending the transmission allows a substantial suppression of inter-cell and intra-cell interference that can be inflicted by the terminal. FIG. 3B is a diagram of the static response to a resource mismatch (ΔR 330). A cross symbol in RL 245, linking AT 220 and AP 250, indicates communication is suspended in this type of response.

Figure 4A:
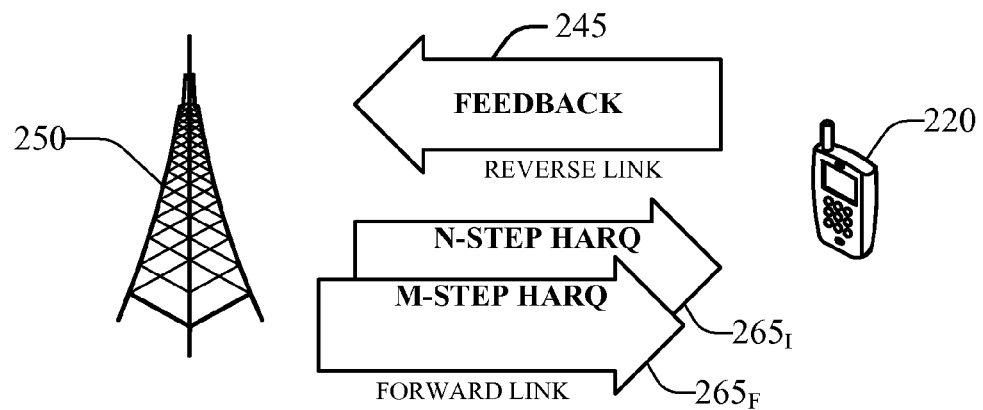
FIGS. 4A, 4B, and 4C are example adaptive responses to mismatch in accordance to an aspect of the subject disclosure.

Regarding supportive and adaptive responses to a resource assignment mismatch, such responses can be viewed as mismatch recovery, in that they can (i) preserve the communication between a subscriber unit (e.g., AT 220) that determines the presence of a resource mismatch and the access point (e.g., AP 250) that services the unit, and (ii) communicate adapted resources to a serving access point scheduling the resources that generate a mismatch. It should be appreciated that supportive responses can result in communication termination at the discretion of the scheduling access point (e.g., AP 250), whereas adaptive responses typically do not lead to communication abandonment—a resilience that can be obtained at the expense of additional complexity in access terminal and access point, and communication overhead. As an illustration, one example of supportive responses and two examples of adaptive responses to mismatch (e.g., assignment violates open-loop projections) are discussed next:

(1) Supportive. Access terminal (e.g., 220) utilizes a projected resource level (for example, open-loop value predicted for PSD) for communication although it mismatches the assignment. Serving access point, in turn, can receive the communication based on mismatched resources; detect a channel quality indicator is incompatible with the scheduled resources (e.g., channel output power from the terminal; AP measures 2 dB instead of the 5 dB assigned to AT) and determine that a transmission cannot be completed with such channel conditions; and adapt the subsequently scheduled resources, such as order of HARQ processes (e.g., N-step HARQ in an initial communication ($265_I$) to M-step HARQ in a subsequent communication ($265_F$), with M>N) utilized for communication in order to increase likelihood of successful decoding at the access point. Alternative to the last step, access point can neglect the terminal's attempt to communicate with a mismatched condition and suspend transmission. It is to be appreciated that a scheduler such as scheduler 254 can determine whether HARQ processes, or substantially any other resource (e.g. allotted subcarriers or subbands, bandwidth, or power), can be adjusted in support of communication with a wireless device. Such a determination can be based on various scheduling algorithms available to the scheduler (see above). FIG. 4A illustrates this adaptive response to resource assignment mismatch.

Figure 4B:
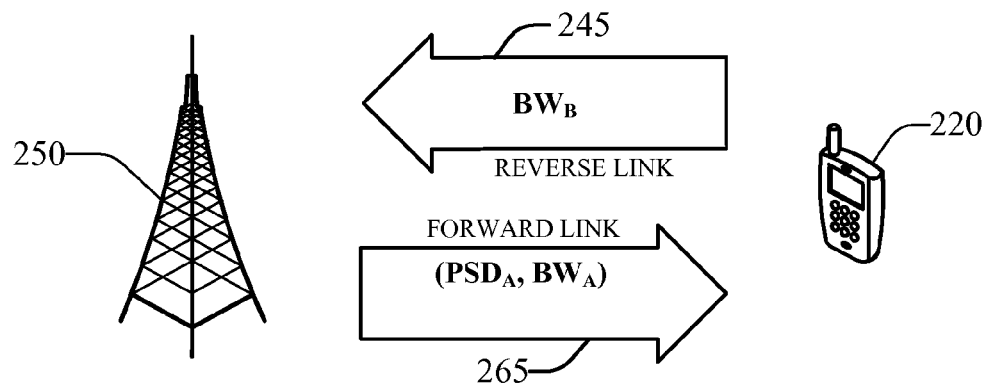

(2) Adaptive. Access terminal (e.g., AT 220) partially adopts the scheduled assignment (e.g., $PSD_A$ and $BW_A$) and communicates with a scheduling access point (e.g., AP 250) employing the lowest possible power density that permits transmission ($PSD_{MIN}$), albeit such $PSD_{MIN}$ is different from the terminal's assignment. The communication can consist of a packet transmission wherein the packet indicates a bandwidth ($BW_B$) value compatible with the projected resources. Upon receiving the alternative resources, the scheduling AP can, in subsequent assignments, re-schedule a bandwidth and assign $BW_B$ to the mobile station. It should be appreciated that there is an overhead associated with transmitting the adjusted resource to the serving AP. The adjusted resource level can be conveyed in a transmitted data packet's header. FIG. 4B illustrates this example adaptive response.

Figure 4C:
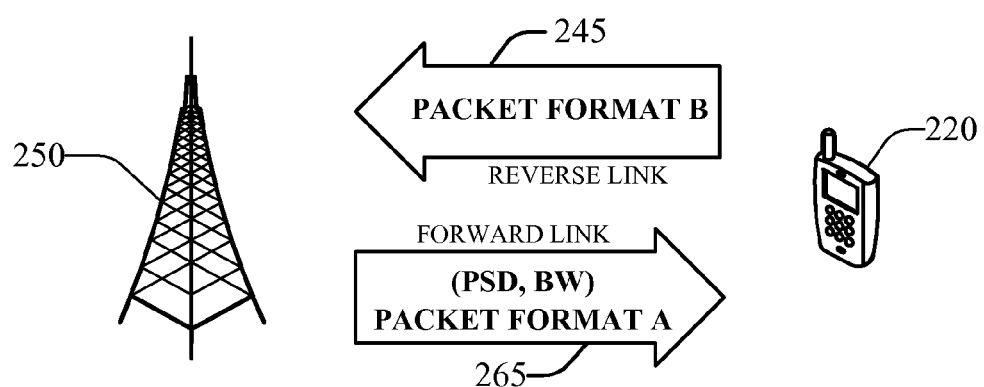

(3) Adaptive. Access terminal receives a PSD and BW, and data packet format assignment. If AT determines that there is a mismatch between, e.g., the assigned PSD and a lower, projected $PSD^{(op)}$ (e.g., originated in an open-loop projection), access terminal can assess whether for the assigned data packet format a communication adopting $PSD^{(op)}$ can be completed under current channel conditions. In case where such an assessment indicates that communication can fail, AT responds to the mismatch by partially retaining the assignment, and lowering the data packet format to a format with lower spectral efficiency, encoding rate and/or modulation, etc., that can be conveyed with the lower $PSD^{(op)}$ with existing channel quality indicators. FIG. 4C illustrates this example adaptive response to resource assignment mismatch.

It is to be appreciated that due to system specifications, an adaptive response as delineated above can be possible if the wireless network where communication takes place does afford packet format change. In an aspect, an access point (e.g. AP 250) in such a network can transmit a listing of compatible data packet formats—e.g., specific spectral efficiency, packet size, code rate and modulation, and order of HARQ—that are compatible with the wireless system (for example, third generation long-term evolution (3G LTE), third generation ultra mobile broadband (3G UMB), etc.) standard specification. It is noted that as employed herein, compatible packet formats refer generally to a set of packet formats that are mutually compatible, or are compatible with a subset of specific (e.g., "master") members of the set, such that when a terminal (e.g., AT 220) is assigned a member of this set, or one of the "master" members, the terminal can select another member of said set and use it as an operational, valid alternative to the assigned packet format for a given packet on an assignment. The listing of formats can be transmitted by each AP that a terminal acquires and incorporates in an active set (e.g., assigns a cell ID), and stored in a terminal's memory such as memory 236. In another aspect, the packet format used for encoding or building the resource-adapted packet can be indicated in predetermined (by the wireless system's specification) number of modulation symbols in the packet's header. In yet another aspect, a dedicated channel such as a reverse link rate indication channel, termed herein R-RICH, can be employed to convey the resource-adapted data packet format.

Figure 5:
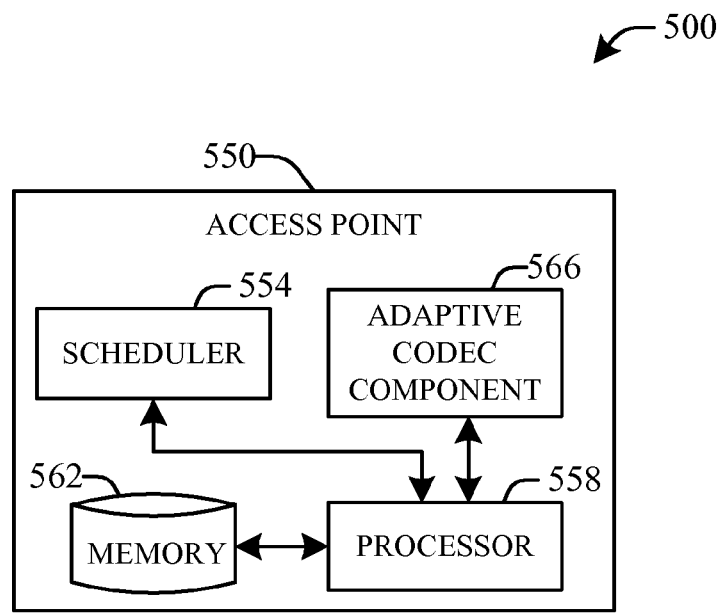
FIG. 5 is a block diagram of an example system that processes a mismatch recovery response involving resource-adapted data packet formats according to an aspect herein.

FIG. 5 is an example embodiment 500 of a system that processes a mismatch recovery response involving resource-adapted data packet formats as discussed above. The system is embodied in an access point 550 that can include a scheduler 554, a processor 558, a memory 562, and an adaptive codec component 566. Component 554 has substantially the same functionality as scheduler 254, and as such it can communicate resource assignments to user equipment in the sector/cell AP 550 services. As discussed supra, an example mismatch recovery can involve an access terminal (e.g., AT 220) generating and transmitting multiple, disparate data packets with multiple formats. Adaptive codec component 566 decodes such plurality of data packets. Decoding is based on a multiple hypothesis (e.g., packet formats) decoding algorithm, such as beam search, greedy decoding, stack multiple hypotheses approach, etc. Additionally, component 566 can issue and communicate error messages associated with failing to decode/receive a data packet format. In an aspect, supported packet formats can reside in memory 562 and component 566 can access such information upon determining a disparate format has been received with respect to the format utilized for transmission of information. In another aspect, the packet format, as well as encoding detail can be received with the data packet itself, in accordance with an aspect discussed supra. Decoding algorithms can be stored in memory 562, and partially executed by processor 558. It is noted that component 566 is termed herein adaptive to indicate that it can adapt to receiving various data formats as a function of time.

Figure 6:
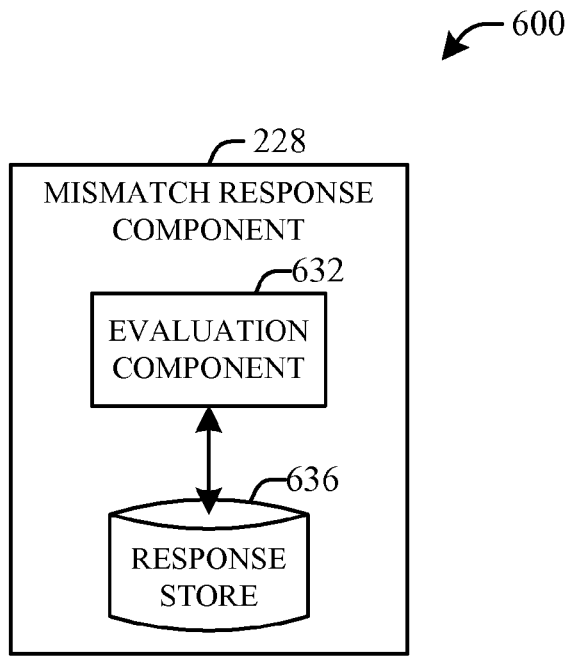
FIG. 6 illustrates an example embodiment of a mismatch response component that determines a resource mismatch recovery in accordance with an aspect of the subject disclosure.

FIG. 6 illustrates an example embodiment 600 of mismatch response component 228 that determines and executes, completely or partially, a resource mismatch recovery in accordance with aspects described hereinbefore. Mismatch response component can exploit an evaluation component 632 that assesses conditions of the wireless system (e.g., set-point in an open loop resource projection, channel conditions, cell traffic load, average cell interference as observed by a serving access point, an average cell interference, an indication of other-sector interference, antennas available at serving access point) and selects a suppressive, supportive, or adaptive response such as those in examples (1)-(3) described above. Responses algorithms can be retrieved from response store 636, and processor 236 can configure to conduct part of the assessment leading to response selection.

In an aspect, to determine a mismatch recovery response, evaluation component 632 can rely on artificial intelligence (AI) to identify a specific context or action, or generate a probability distribution of specific states of a wireless system or behavior of a plurality of terminals. Artificial intelligence relies on applying advanced mathematical algorithms—e.g., decision trees, neural networks, regression analysis, cluster analysis, genetic algorithm, and reinforced learning—to a set of available data (information) on the system or user. In particular, evaluation component 632 can thus employ a probabilistic-based or statistical-based approach, for example, in connection with making determinations or inferences. The inferences can be based in part upon explicit training of classifier(s) (not shown) before employing the system, or implicit training based at least upon previous, or current actions, commands, instructions, and the like during use of the system.

Evaluation component 632 can also employ one of numerous methodologies for learning from data and then drawing inferences from the models so constructed (e.g., hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Figure 7:
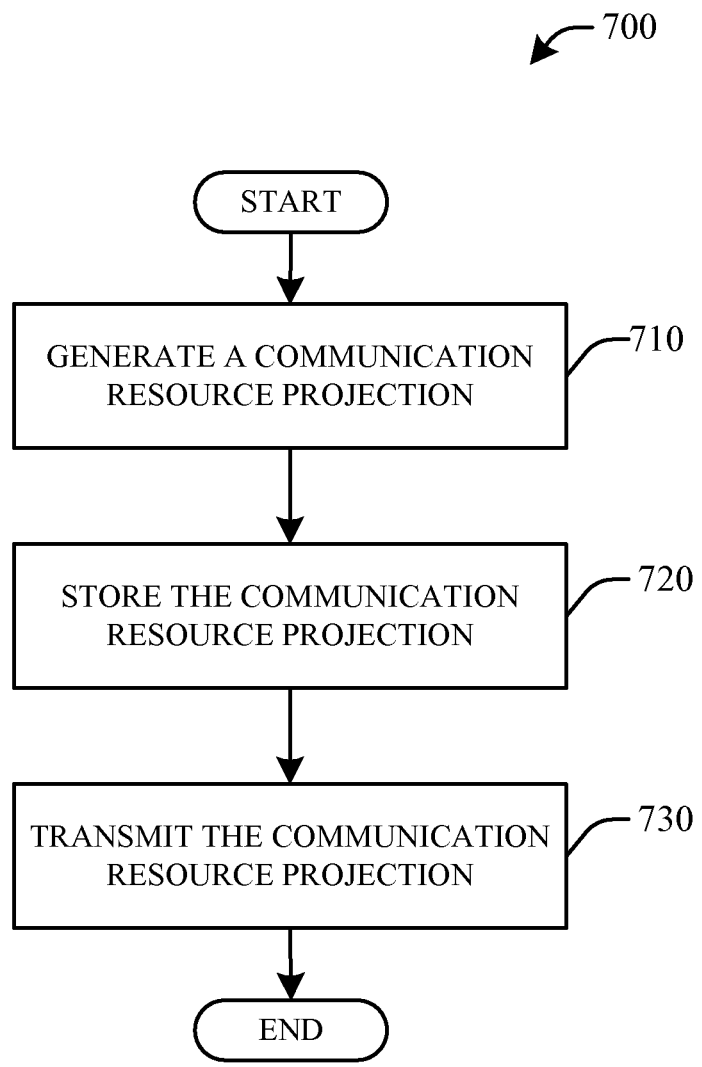
FIG. 7 presents a flowchart of a method for generating and manipulating a communication resource projection in a wireless system in accordance with aspects of the subject specification.
Figure 8:
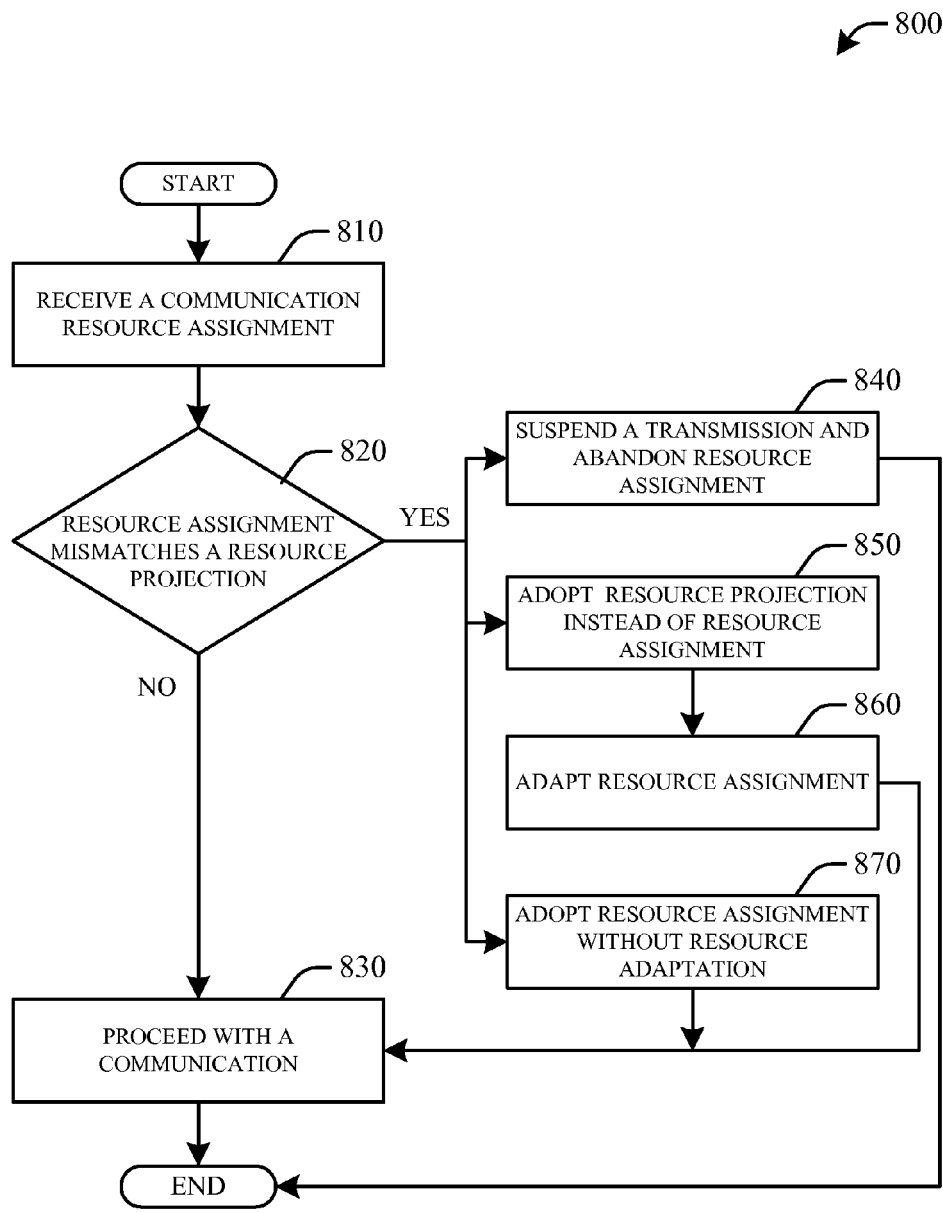
FIG. 8 is a flowchart of a method for responding to a communication mismatch in a wireless communication system.
Figure 9:
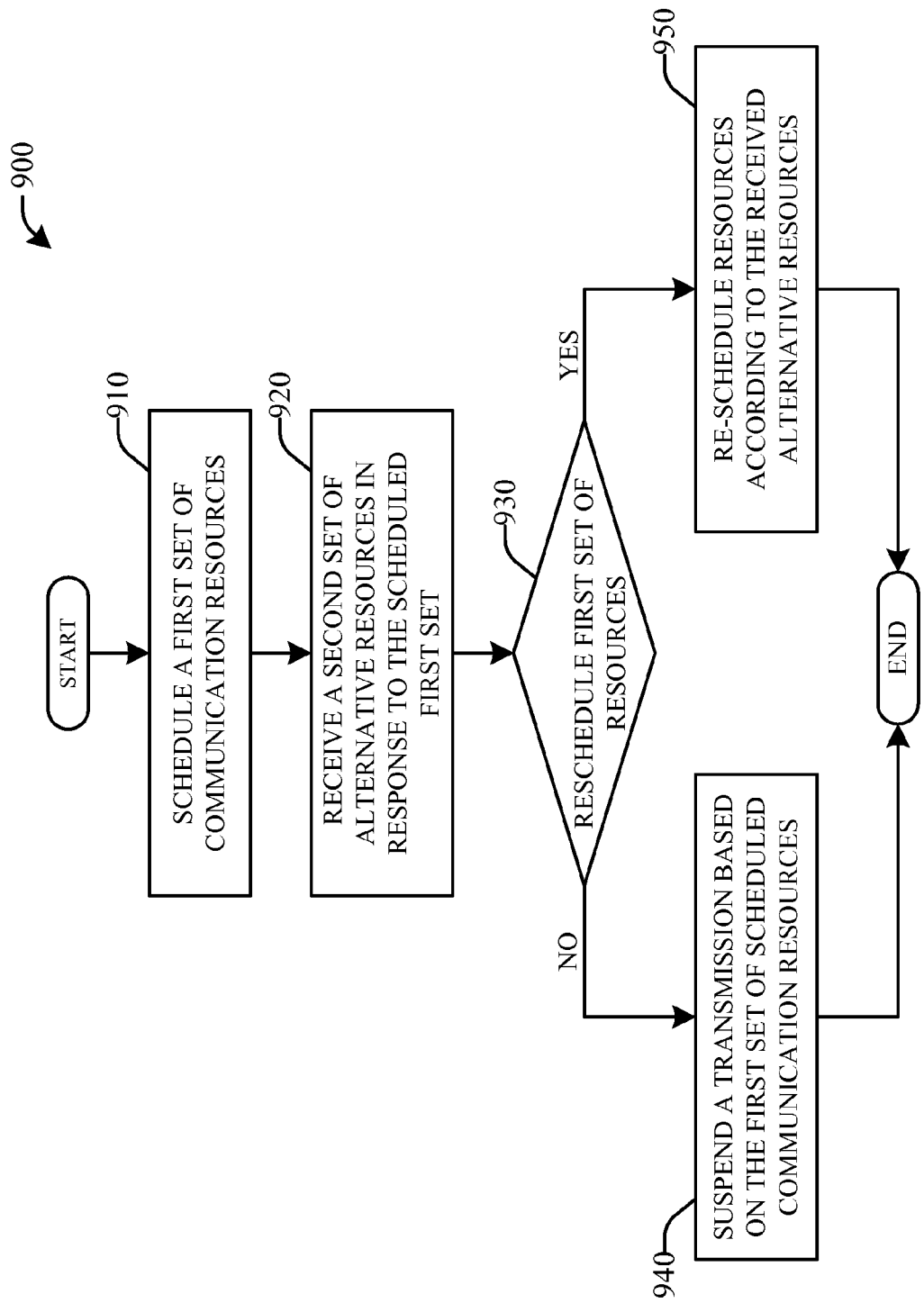
FIG. 9 is a flowchart of a method for scheduling/re-scheduling communication resources in a wireless communication system in accordance with an aspect of the subject specification.

In view of the example systems shown and described above, methodologies that may be implemented in accordance with the disclosed subject matter, will be better appreciated with reference to the flowcharts of FIGS. 7, 8, and 9. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 7 presents a flowchart of a method 700 for generating and manipulating a communication resource projection in a wireless system. At act 710, a communication resource projection is generated. The projection is based on adhering to specific communication constraints, such as QoS target levels imposed by a service provider, such as cell/sector capacity, peak data rate, and latency in predetermined applications (e.g., on-line gaming). Other resource projection arise from operational requirements and as such are time-dependent; as an example, the resources can projected so as to limit the amount of other-sector inference inflicted on the system by a bursty subscriber unit in a partially loaded system. In such scenario, the resource can be power or power spectral density, wherein the resource projection can be the level of power output afforded to a bursty user starting a communication after a substantial period of silence. It should be appreciated that feedback mechanisms for interference mitigation, such as offset-based ($\Delta$-based) fast OSI mitigation, can adopt the projected resource level generated in 710 as the reference resource level needed for effective differential control of interference. It should further be appreciated that projected levels of other resources, such as assignment of subcarriers in both integral and fractional frequency reuse, can be generated at act 710. In fractional frequency reuse, the projected resources can be low-power/high-power channels and their projected assignment based on the proximity of a mobile to a sector/cell boundary (see FIG. 1). In an aspect, the projection can be derived from an open-loop estimate, employing a plurality of pilot signals as input signal in the open-loop computation.

Acts 720 and 730 are manipulation acts. In 720, projected resource levels are stored (e.g. in memory 236) for later utilization and analysis, while in 730 the projections are transmitted in order to effect a feedback process. In an aspect, feedback is provided to a service access point that schedules communication resources, such as AP 250. Prior to a resource assignment, such an access point via a scheduler (e.g., scheduler 254), can adopt the projection levels transmitted in act 730 as suggested operational levels for a subscriber unit carrying out said act, which can ensure said subscriber unit meets communications constraints that led to the resource estimate 710.

FIG. 8 is a flowchart of a method 800 for responding to a communication mismatch in a wireless communication system. At act 810, a communication resource assignment is received. In an aspect an access point (e.g. AP 250) schedules a set of resources—for example, power, PSD, bandwidth, subcarriers, antenna selection, reuse frequency pattern, etc.— to a mobile (e.g., 220) for communication. Act 820 is a validation act that tests whether a resource assignment present a mismatch with a set-point projection of resources required to satisfy a plurality of conditions, such as level of other sector interference, data peak rate, successful communication at a specified packet format, etc. In aspect, such set points are determined using methodology 700, discussed hereinbefore. In the absence of a mismatch, a communication continues being carried over. In another aspect, such communication can occur in a 3G UMB wireless system, which is a packet switched wireless communication protocol that displays features such as flexible bandwidth utilization (e.g. BWs from 1.25 MHz up to 20 MHz can be exploited), low latency (e.g., less or about 16 ms), operation in MIMO mode (see FIGS. 10 and 11) among other features.

If validation check 820 indicates there is a mismatch between the resource assignment and the projected resources, a response is generated. Such response can be effected in act 840, wherein a transmission is suspended and the resource assignment of act 810 is abandoned; or in act 850, wherein projected resources are adopted instead of the resource assignment of act 810. In act 860, assigned communication resources are adapted to a level that can allow a communication to proceed without exceeding conditions adopted at the time of generating a resource projection. In an aspect, adaptation can consist of, for example, data packet format change, HARQ process order modification, etc. A further response to the mismatch determination (act 820) is enacted in 870, wherein the resource assignment is adopted without resource adjustment.

FIG. 9 is a flowchart of a method for scheduling/re-scheduling communication resources in response to receiving an alternative set of resources from a terminal that has determined an assignment mismatch in a wireless communication system. At act 910 a first set of communication resources is scheduled. In an aspect, the set of resources are scheduled for a terminal (e.g., mobile 220) communicating with the access point (e.g. AP 250) scheduling the resources. At 920, a second set of resources is received in response to the first set of resources. In another facet of the aspect, such second set can arise from the terminal that is communicating with the scheduling AP and that has determined the first set of scheduled resources (act 910) mismatches resource projections established by the terminal (see FIGS. 4A, 4B, and 4C, and methodology 700). At act 930, a determination is made as to whether the first set of resources is to be rescheduled in view of the received alternative set. In yet another facet of the aspect, re-scheduling the first set of resources can lead to recovery from the mismatch that can have originated step 920 (see also 800). If determined that resources are not to be re-scheduled, a transmission is suspended in act 940; otherwise, the first set of resources are re-scheduled at 950.

Figure 10:
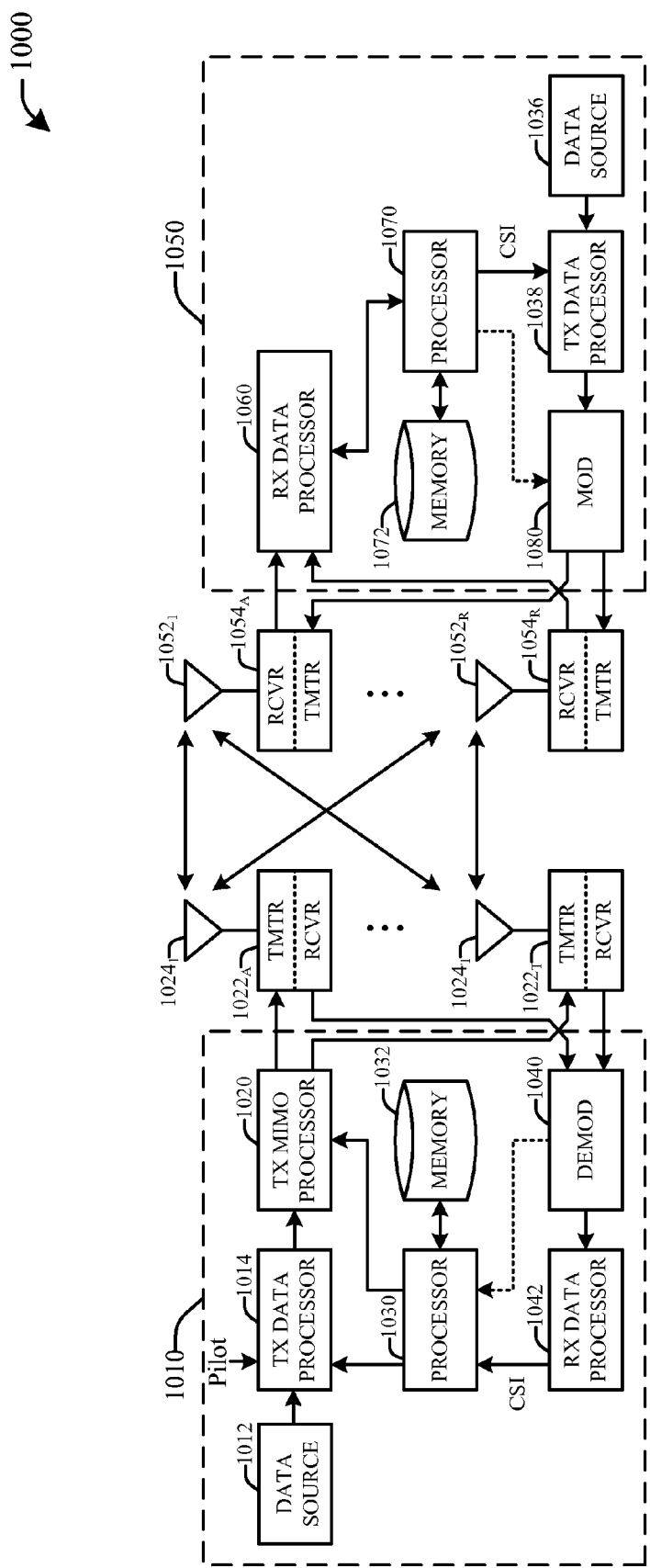
FIG. 10 is a block diagram of an example multiple-input multiple-output (MIMO) transmitter and a receiver that can exploit assignment mismatch recovery according to aspects disclosed in the subject specification.

FIG. 10 is a block diagram 1000 of an embodiment of a transmitter system 1010 (such as base station 140) and a receiver system 1050 (e.g. access terminal 220) in a multiple-input multiple-output (MIMO) system that can provide for cell/sector communication in a wireless communication environment in accordance with one or more aspects set forth herein. At the transmitter system 1010, traffic data for a number of data streams can be provided from a data source 1012 to transmit (TX) data processor 1014. In an embodiment, each data stream is transmitted over a respective transmit antenna. TX data processor 1014 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions executed by processor 1030, the instructions as well as the data may be stored in memory 1032. In addition, in accordance with an aspect of the present innovation, a transmitter can switch modulation schemes depending on feedback received from a receiver in response to a resource mismatch.

The modulation symbols for all data streams are then provided to a TX MIMO processor 1020, which may further process the modulation symbols (e.g., OFDM). TX MIMO processor 1020 then provides $N_T$ modulation symbol streams to $N_T$ transceivers (TMTR/RCVR) $1022_A$ through $1022_T$. In certain embodiments, TX MIMO processor 1020 applies beamforming weights (or precoding) to the symbols of the data streams and to the antenna from which the symbol is being transmitted. Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $1022_A$ through $1022_T$ are then transmitted from $N_T$ antennas $1024_1$ through $1024_T$, respectively. At receiver system 1050, the transmitted modulated signals are received by $N_R$ antennas $1052_1$ through $1052_R$ and the received signal from each antenna 1052 is provided to a respective transceiver (TMTR/RCVR) $1054_A$ through $1054_R$. Each transceiver $1054_A$-$1054_R$ conditions (e.g., filters, amplifies, and downconverts) a respective received signal, digitizes the conditioned signal to provide samples, and further processes the samples to provide a corresponding "received" symbol stream.

An RX data processor 1060 then receives and processes the $N_R$ received symbol streams from $N_R$ transceiver $1054_A$-$1054_R$ based on a particular receiver processing technique to provide $N_T$ "detected" symbol streams. The RX data processor 1060 then demodulates, deinterleaves, and decodes each detected symbol stream to recover the traffic data for the data stream. The processing by RX data processor 1060 is complementary to that performed by TX MIMO processor 1020 and TX data processor 1014 at transmitter system 1010. A processor 1070 periodically determines which pre-coding matrix to use, such a matrix can be stored in memory 1072. Processor 1070 formulates a reverse link message comprising a matrix index portion and a rank value portion. Memory 1072 may store instructions that when executed by processor 1070 result in formulating the reverse link message. As an example, such information can comprise an adjusted communication resource, an offset value for adjusting a scheduled resource, and information for decoding a data packet format. The reverse link message may comprise various types of information regarding the communication link or the received data stream, or a combination thereof. The reverse link message is then processed by a TX data processor 1038, which also receives traffic data for a number of data streams from a data source 1036, modulated by a modulator 1080, conditioned by transceiver $1054_A$ through $1054_R$, and transmitted back to transmitter system 1010.

At transmitter system 1010, the modulated signals from receiver system 1050 are received by antennas $1024_1$-$1024_T$, conditioned by transceivers $1022_A$-$1022_T$, demodulated by a demodulator 1040, and processed by a RX data processor 1042 to extract the reserve link message transmitted by the receiver system 1050. Processor 1030 then determines which pre-coding matrix to use for determining the beamforming weights and processes the extracted message.

Single-user MIMO mode of operation corresponds to the case in which a single receiver system 1050 communicates with transmitter system 1010, as illustrated in FIG. 10 and according to the operation described above. In such a system, the $N_T$ transmitters $1024_1$-$1024_T$ (also known as TX antennas) and $N_R$ receivers $1052_1$-$1052_R$ (also known as RX antennas) form a matrix channel (e.g., Rayleigh channel, or Gaussian channel) for wireless communication. The SU-MIMO channel is described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to $\min\{N_T, N_R\}$. A MIMO channel formed by the $N_T$ transmit and $N_R$ receive antennas may be decomposed into $N_V$ independent channels, which are also referred to as spatial channels, where $N_V \leq \min\{N_T, NR\}$. Each of the $N_V$ independent channels corresponds to a dimension.

In one aspect, transmitted/received symbols with OFDM, at tone ω, can be modeled by:

$$y(\omega)=\underline{H}(\omega)c(\omega)+n(\omega). \quad (1)$$

Here, y(ω) is the received data stream and is a $N_R \times 1$ vector, $\underline{H}(\omega)$ is the channel response $N_R \times N_T$ matrix at tone ω (e.g., the Fourier transform of the time-dependent channel response matrix $\underline{h}$), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 1010, and $N_V$ can be scheduled at the discretion of the transmitter (e.g., access point 250) based at least in part on channel conditions and the rank reported by the terminal. It should be appreciated that c(ω) is the result of at least one multiplexing scheme, and at least one pre-coding (or beamforming) scheme applied by the transmitter. Additionally, c(ω) is convoluted with a power gain matrix, which determines the amount of power transmitter 1010 allocates to transmit each data stream $N_V$. It should be appreciated that such a power gain matrix can be a resource that is assigned to access terminal 220, and it can be managed through adjustment of offsets as described herein. In view of the FL/RL reciprocity of the wireless channel, it should be appreciated that a transmission from MIMO receiver 1050 can also be modeled in the fashion of Eq. (1), including substantially the same elements. In addition, receiver 1050 can also apply pre-coding schemes prior to transmitting data in the reverse link.

In system 1000 (FIG. 10), when $N_T = N_R = 1$, the system reduces to a single-input single-output (SISO) system, whereas $N_T > 1$ and $N_R = 1$ reduces to a multiple-input single-output (MISO). Both systems can provide for sector communication in a wireless communication environment in accordance with one or more aspects set forth herein.

Figure 11:
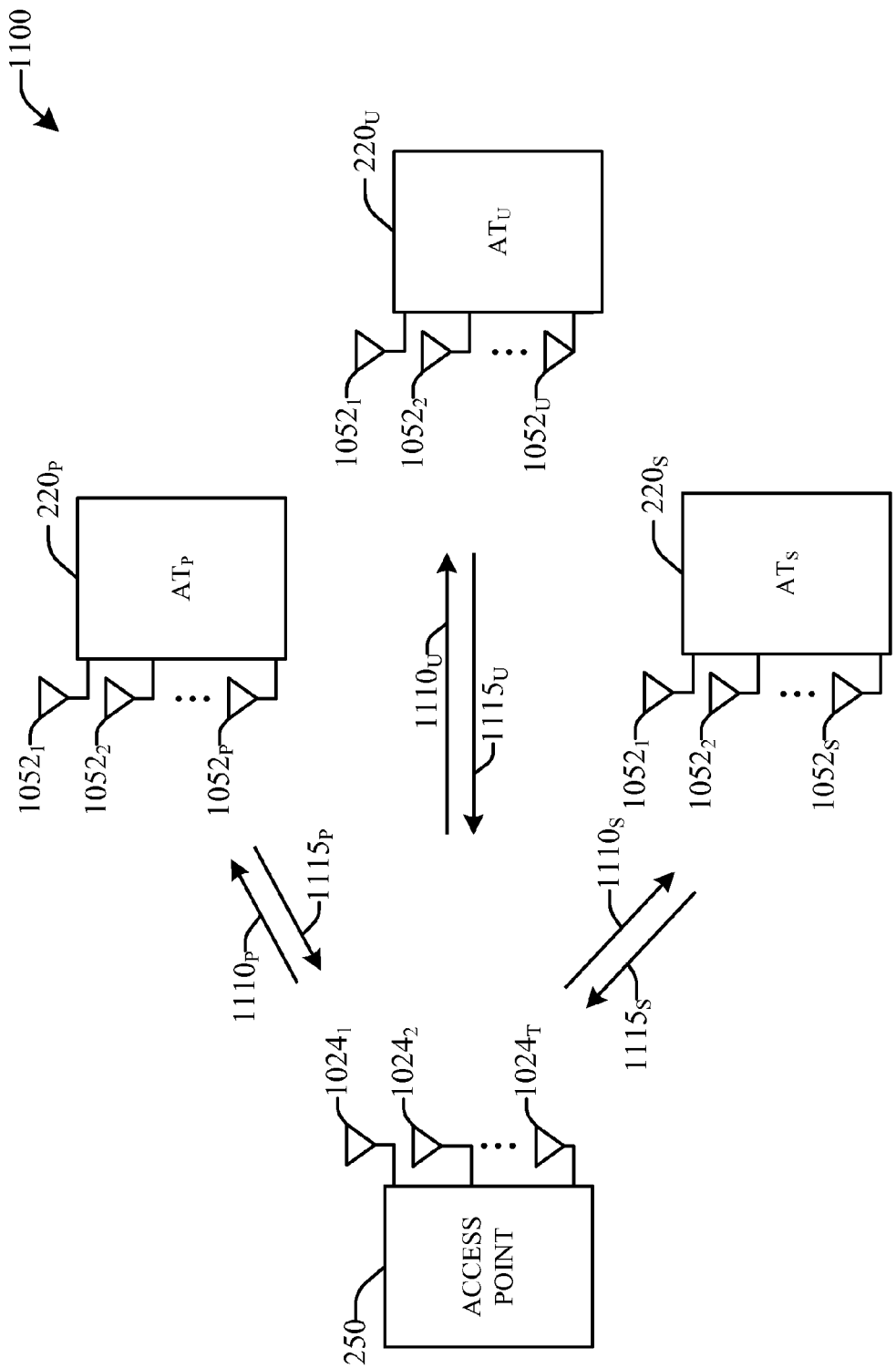
FIG. 11 is a block diagram of an example multiple-user MIMO configuration where communication can take place according to one or more aspects of the subject disclosure.

FIG. 11 illustrates an exemplary multiple-user MIMO system 1100 in which three ATs $220_P$, $220_U$, and $220_S$ communicate with an access point 250 in accordance with aspects disclosed in the subject specification. Access point has $N_T$ TX antennas $1054_1$-$1024_T$, and each of the ATs has multiple RX antennas; namely, $AT_P$ has $N_P$ antennas $1052_1$-$1052_P$, $AP_U$ has $N_U$ antennas $1052_1$-$1052_U$, and $AP_S$ has $N_S$ antennas $1052_1$-$1052_S$. Communication between terminals and the base station is effected through uplinks $1115_P$, $1115_U$, and $1115_S$. Similarly, downlinks $1110_P$, $1110_U$, and $1110_S$ facilitate communication between access point 250 and terminals $AT_P$, $AT_U$, and $AT_S$, respectively. Additionally, communication between each terminal and access point is implemented in substantially the same manner, through substantially the same components, as illustrated in FIG. 10 and its corresponding description. Because terminals can be located in substantially different locations within the cell serviced by access point 250, each user equipment $220_P$, $220_U$, and $220_S$ has its own matrix channel $\underline{h}_\alpha$ and response matrix $H_\alpha$ (α=P, U, and S), with its own rank. Intra-cell interference can be present due to the plurality of users present in the cell serviced by the base station 250. Although illustrated with three terminals in FIG. 11, it should be appreciated that a MU-MIMO system can comprise any number of terminals, indicated below with index k. Each of the access terminals $220_P$, $220_U$, and $220_S$ can transmit feedback information regarding assigned resources to AT 250; for instance, one or more adjusted communication resources, offsets for adjusting a scheduled resource, as well as information for decoding adapted data packet formats employed for transmission in view of a resource assignment mismatch as described above. Moreover, AT 250 can re-schedule resources for each of the terminals $220_P$, $220_U$, and $220_S$ accordingly and independently of each other's resource assignment.

In one aspect, transmitted/received symbols with OFDM, at tone ω and for user k, can be modeled by:

$$y_k(\omega)=\underline{H}_k(\omega)c_k(\omega)+\underline{H}_k(\omega)\Sigma'c_m(\omega)+n_k(\omega). \quad (2)$$

Here, symbols have the same meaning as in Eq. (1). It should be appreciated that due to multi-user diversity, other-user interference in the signal received by user k is modeled with the second term in the left-hand side of Eq. (2). The prime (') symbol indicates that transmitted symbol vector $c_k$ is excluded from the summation. The terms in the series represent reception by user k (through its channel response $\underline{H}_k$) of symbols transmitted by a transmitter (e.g., access point 250) to the other users in the cell.

Figure 12:
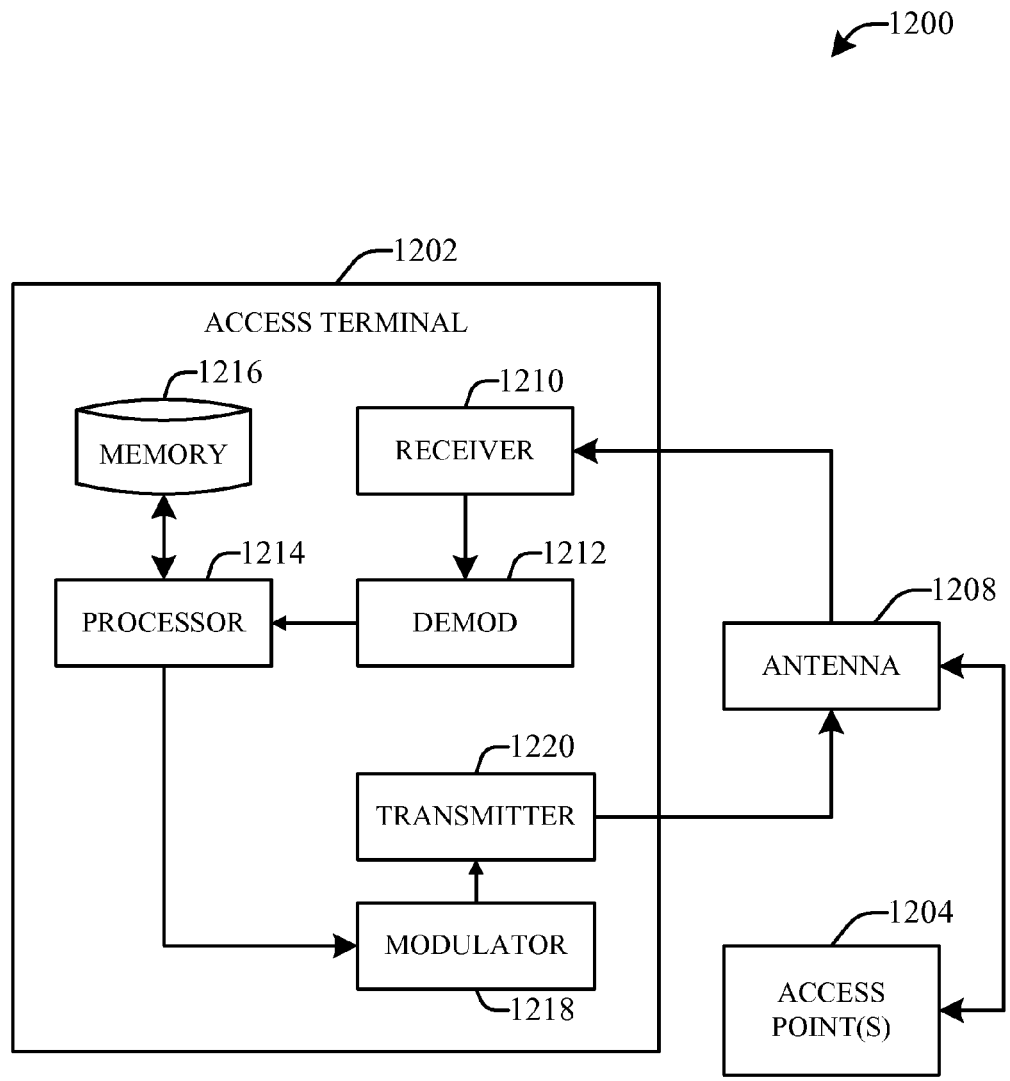
FIG. 12 is a block diagram of an example system that coordinates reverse link resources and recovery from resource mismatch in a wireless communication system.

FIG. 12 is a block diagram of a system 1200 that coordinates reverse link communication resources and recovery from resource assignment mismatch in a wireless communication system in accordance with various aspects described herein. In one example, system 1200 includes an access terminal 1202. As illustrated, access terminal 1202 can receive signal(s) from one or more access points 1204 and transmit to the one or more access points 1204 via an antenna 1208. Additionally, access terminal 1202 can comprise a receiver 1210 that receives information from antenna 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to access terminal 1202. Additionally, access terminal 1202 can employ processor 1214 to perform methodologies 700, 800, and 900, and/or other appropriate methodologies. Access terminal 1202 can also include a modulator 1218 that can multiplex a signal for transmission by a transmitter 1220 via antenna 1208 to one or more access points 1204.

Figure 13:
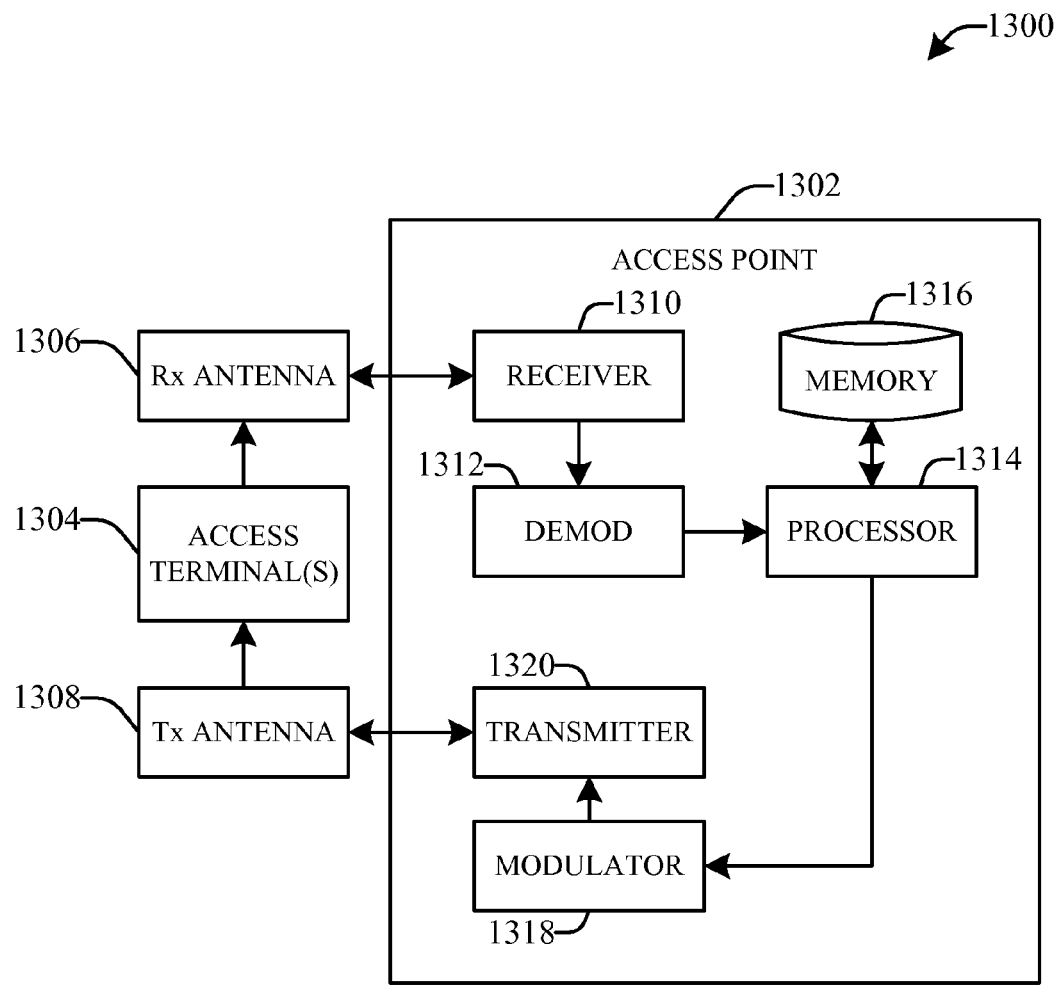
FIG. 13 is a block diagram of a system that coordinates reverse link resource and assignment mismatch recovery in a wireless communication system in accordance with various aspects.

FIG. 13 is a block diagram of a system 1300 that coordinates reverse link communication resource and interference management in a wireless communication system in accordance with various aspects described herein. In one example, system 1300 includes a base station or access point 1302. As illustrated, access point 1302 can receive signal(s) from one or more access terminals 1304 via a receive (RX) antenna 1306 and transmit to the one or more access terminals 1304 via a transmit (TX) antenna 1308.

Additionally, access point 1302 can comprise a receiver 1310 that receives information from receive antenna 1306. In one example, the receiver 1310 can be operatively associated with a demodulator (Demod) 1312 that demodulates received information. Demodulated symbols can then be analyzed by a processor 1314. Processor 1314 can be coupled to memory 1316, which can store information related to code clusters, access terminal assignments, lookup tables related thereto, unique scrambling sequences, and/or other suitable types of information. Access point 1302 can also include a modulator 1318 that can multiplex a signal for transmission by a transmitter 1320 through transmit antenna 1308 to one or more access terminals 1304.

Next, systems that can enable aspects of the disclosed subject matter are described in connection with FIGS. 14 and 15. Such systems can include functional blocks, which can be functional blocks that represent functions implemented by a processor or an electronic machine, software, or combination thereof (e.g., firmware).

Figure 14:
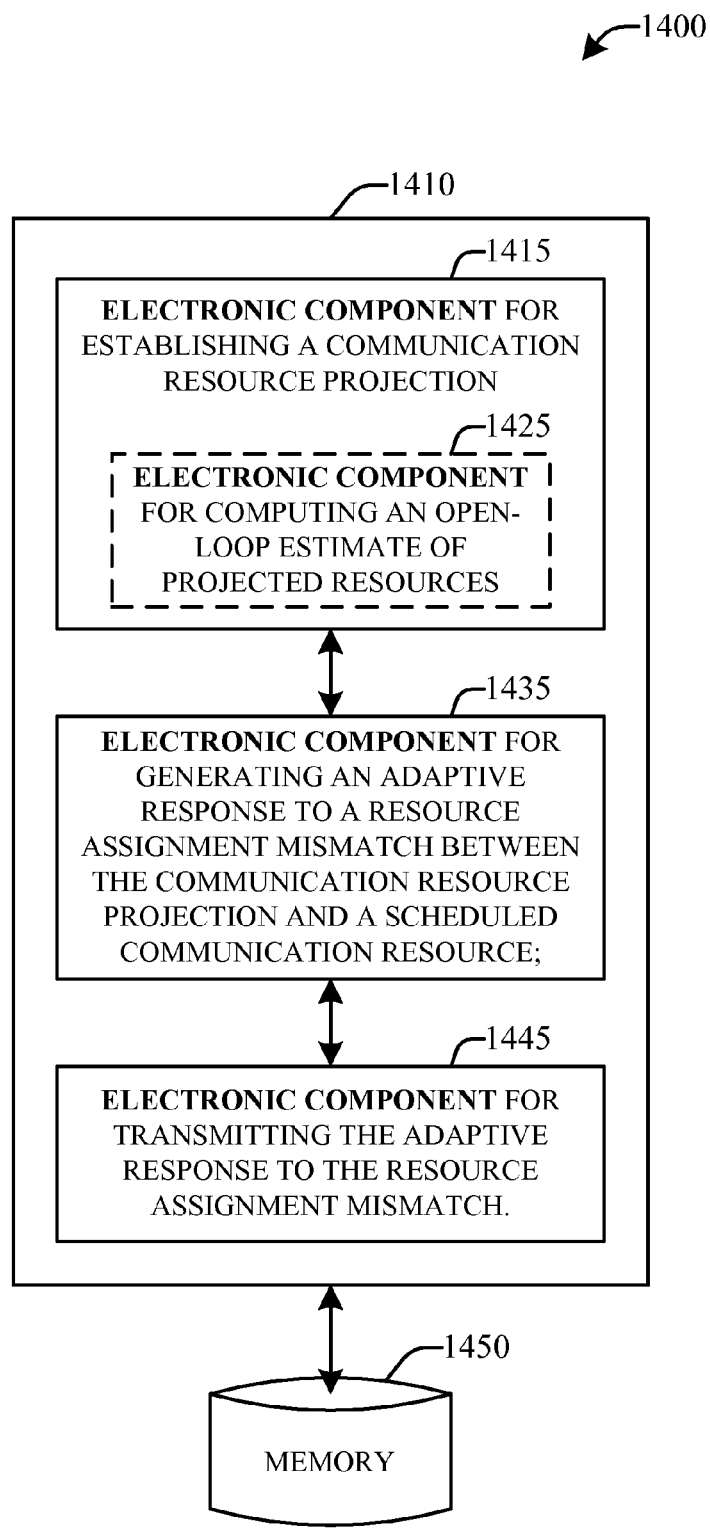
FIG. 14 is a block diagram of an example system that enables resource assignment mismatch recovery in a wireless system according to an aspect of this disclosure.

FIG. 14 illustrates a block diagram of an example system that enables recovery from a resource assignment mismatch in a wireless system according to aspects described in the subject specification. System 1400 can reside, at least partially, within a mobile (e.g., access terminal 220). System 1400 includes a logical grouping 1410 of electronic components that can act in conjunction. In an aspect, logical grouping 1410 includes an electronic component 1415 for establishing a communication resource projection, which can operate concurrently with, sequentially to, or instead of, an electronic component 1425 for computing an open-loop estimate of projected resources, channel quality conditions in the wireless system can be employed as input signal to the open loop; an electronic component 1435 for generating an adaptive response to a resource assignment mismatch between the communication resource projection and a scheduled communication resource; and an electronic component 1445 for transmitting the adaptive response to the resource assignment mismatch.

System 1400 can also include a memory 1450 that retains instructions for executing functions associated with electronic components 1415, 1425, 1435, and 1445, as well as measured and computed data that may be generated during executing such functions. While shown as being external to memory 1450, it is to be understood that one or more of electronic components 1415, 1425, 1435, and 1445 can exist within memory 1450.

Figure 15:
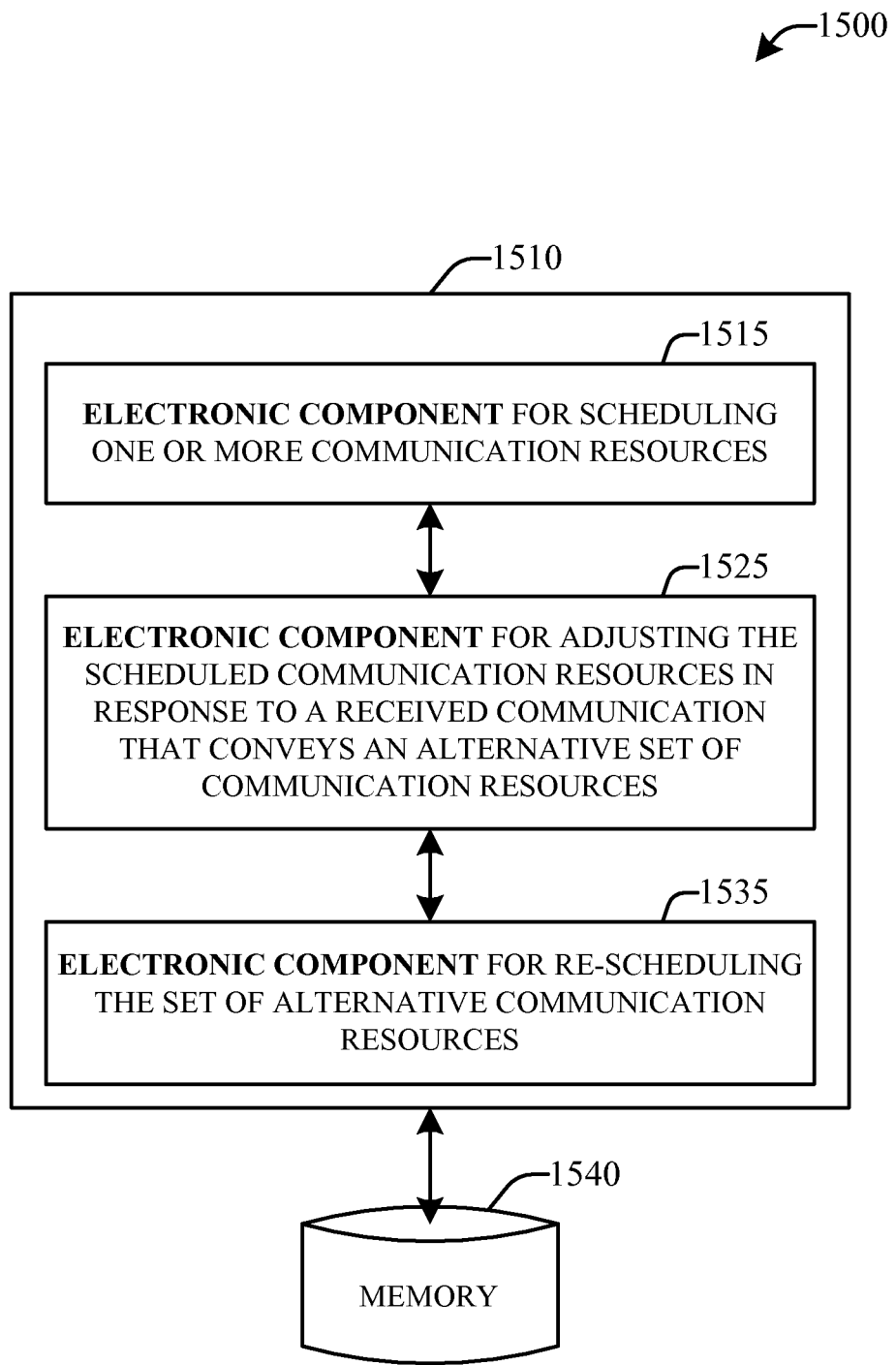
FIG. 15 is a block diagram of an example system that enables scheduling/re-scheduling of resources in a wireless communication system in accordance with an aspect of the subject innovation.

Referring now to FIG. 15, it illustrates a block diagram of an example system 1500 that enables scheduling/re-scheduling of resources in a wireless communication system in accordance with an aspect of the subject innovation. System 1500 can reside, at least partially, within a base station (e.g., access point 550), and can include a logical grouping 1510 of electronic components that can act in conjunction. In an aspect, logical grouping 1510 includes an electronic component 1515 for scheduling one or more communication resources; electronic component 1525 for adjusting the scheduled communication resources in response to a received communication that conveys an alternative set of communication resources; and component 1535 for re-scheduling the set of alternative communication resources.

As illustrated, example system 1500 can also include a memory 1540 that retains instructions for executing functions associated with electrical components 1515, 1525, and 1535, as well as measured and computed data that may be generated during executing such functions. While shown as being external to memory 1540, it is to be understood that one or more of electronic components 1515, 1525, and 1535 can exist within memory 1540.

It is to be understood that the embodiments described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

As it employed herein, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for recovering from a communication resource mismatch, that is employed in a wireless communication system, comprising:
   receiving a communication resource assignment at an access terminal;
   determining a resource mismatch exists between the resource assignment and a projected communication resource level, wherein the projected communication resource level is based on a difference in pilot signal strength between a serving sector and a dominant non-serving sector; and
   responding to the communication resource mismatch with a resource adjustment.

2. The method of claim 1, further comprising transmitting the resource adjustment.

3. The method of claim 1, wherein the communication resource assignment includes one or more selected from the group consisting of a power output level and a power spectral density.

4. The method of claim 1, wherein the communication resource assignment includes a data packet format.

5. The method of claim 1, wherein the communication resource assignment includes one or more selected from the group consisting of a bandwidth, a frequency reuse index, and a subcarrier spacing.

6. The method of claim 1, wherein the resource adjustment includes employing the projected communication resource level instead of the assigned resources.

7. The method of claim 1, wherein the resource adjustment includes employing a portion of the assigned resources but transmitting at a minimal power spectral density to convey the projected communication resource level.

8. The method of claim 1, wherein the resource adjustment includes adapting a data packet format to a format compatible with transmission at a power spectral density (PSD) that is lesser than an assigned PSD.

9. The method of claim 8, further comprising transmitting a data packet at a PSD that is compatible with the adapted data packet format.

10. The method of claim 9, further comprising conveying the projected communication resource level in the transmitted data packet.

11. The method of claim 10, wherein conveying the projected communication resource level incurs an overhead of m bits transmitted in the header of the data packet, wherein m is compatible with a specification of the wireless communication system or is a predetermined number of modulation symbols.

12. The method of claim 10, wherein conveying the projected communication resource level utilizes a dedicated reverse link rate indication channel.

13. The method of claim 1, wherein the access terminal has reverse link data communications with the serving sector, forward link data communications with the dominant non-serving sector, and no reverse link data communications with the dominant non-serving sector.

14. An electronic device configured to recover from a communication resource mismatch by:
   receiving a communication resource assignment at an access terminal;
   determining a resource mismatch exists between the resource assignment and a projected communication resource level, wherein the projected communication resource level is based on a difference in pilot signal strength between a serving sector and a dominant non-serving sector; and
   responding to the communication resource mismatch with a resource adjustment.

15. A wireless communication apparatus, comprising:
   an integrated circuit configured to receive a resource schedule, to compute a resource projection level and determine a mismatch exists between the scheduled resources and the projected resources, and to recover the resource mismatch, wherein the projected resources are based on a difference in pilot signal strength between a serving sector and a dominant non-serving sector; and
   a memory coupled to the integrated circuit and configured to store data.

16. The wireless communication apparatus of claim 15, wherein the integrated circuit is further configured to suspend a communication transmission and abandon the resource schedule upon determination that a mismatch exists between the scheduled resources and the projected resources.

17. The wireless communication apparatus of claim 15, wherein, to recover the resource mismatch, the integrated circuit is further configured to communicate employing the projected resources.

18. The wireless communication apparatus of claim 15, wherein, to recover the resource mismatch, the integrated circuit is further configured to adjust a scheduled resource and communicate employing the adjusted resource.

19. The wireless communication apparatus of claim 18, wherein the integrated circuit is configured to adjust at least one selected from the group consisting of a packet format, a bandwidth, a process order of a hybrid automated repeat request, a power, and a power spectral density.

20. The wireless communication apparatus of claim 19, wherein the adjusted packet format includes a specification of spectral efficiency, a packet size, a code rate, and a modulation scheme to be used with a hybrid repeat request process.

21. The wireless communication apparatus of claim 18, wherein the integrated circuit is further configured to transmit an adjusted resource through a dedicated channel in the physical layer of the wireless communication system.

22. The wireless communication apparatus of claim 15, wherein the integrated circuit is further configured to infer a response to recover the resource mismatch based on at least one selected from the group consisting of a cell traffic load, an average cell interference, an indication of other-sector interference, and a set of antennas available at a serving access point.

23. The wireless communication apparatus of claim 15, wherein the memory is configured to store the computed resource projection.

24. The wireless apparatus of claim 15, wherein the memory is configured to store an algorithm to compute a resource projection level.

25. The wireless communication apparatus of claim 15, wherein the integrated circuit is further configured to measure a pilot strength that is selected from the group consisting of a received pilot signal and a signal-to-thermal noise ratio of a received pilot signal.

26. The apparatus of claim 15, wherein the apparatus is integrated with an access terminal.

27. An apparatus employed in wireless communication, that facilitates recovery from resource mismatch, comprising:
    means for establishing a communication resource projection,
    means for generating an adaptive response to a resource assignment mismatch between the communication resource projection and a scheduled communication resource, wherein the communication resource projection is based on a difference in pilot signal strength between a serving sector and a dominant non-serving sector; and
    means for transmitting the adaptive response to the resource assignment mismatch.

28. The apparatus of 27, wherein the means for establishing a communication resource projection includes means for computing an open-loop estimate of projected resources.

29. The apparatus of claim 27, wherein the apparatus is integrated with an access terminal.

30. A non-transitory computer-readable medium, comprising:
    code for causing a computer to compute an open loop estimate of required resources for communicating wirelessly, subject to one or more communication constraints, wherein the open loop estimate is based on a difference in pilot signal strength between a serving sector and a dominant non-serving sector;
    code for causing a computer to receive a resource assignment;
    code for causing a computer to compare the estimate of required resources for the communicating wirelessly subject to one or more communication constraints to the assigned resources, and determining whether the required and assigned resources are mismatched; and
    code for causing a computer to respond to a resource mismatch by transmitting one or more adjusted resources from the group of assigned resources.

31. The computer-readable medium of claim 30, further comprising code for causing a computer to measure a strength of a received pilot signal.

32. The computer-readable medium of claim 30, further comprising code for causing a computer to measure a signal-to-thermal noise amplitude of a received pilot signal.

33. The computer-readable medium of claim 30, further comprising code for causing a computer to employ the signal-to-thermal noise ratio when computing the open loop estimate of required resources for communicating wirelessly.

34. The computer-readable medium of claim 30, further comprising code for causing a computer to respond to a resource by communicating wirelessly employing one or more adjusted resources from the group of assigned resources.

35. The computer-readable medium of claim 30, wherein the computer-readable medium is integrated with an access terminal.

36. An apparatus that operates in a wireless environment, comprising:
    means for scheduling one or more communication resources;
    means for adjusting the scheduled communication resources in response to a received communication that conveys an alternative set of communication resources, wherein the alternative set of communication resources is based on a difference in pilot signal strength between a serving sector and a dominant non-serving sector; and
    means for re-scheduling the set of alternative communication resources.

37. The apparatus of claim 36, wherein the apparatus is integrated with an access point.

38. In a wireless communication system, an apparatus comprising:
    an integrated circuit configured to assign a set of time-frequency resources, to receive a set of adjusted resources, and to carry out a communication employing an adjusted resource, wherein the adjusted resources are based on a difference in pilot signal strength between a serving sector and a dominant non-serving sector; and
    a memory that is coupled to the integrated circuit and configured to store data and algorithms.

39. The apparatus of claim 38, wherein the integrated circuit is configured to suspend a communication in response to receiving a request for alternative communication resources.

40. The apparatus of claim 39, wherein the integrated circuit employs multiple-hypothesis decoding to decode the multiple data packet formats.

41. The apparatus of claim 39, wherein the integrated circuit is further configured to convey a listing of data packet formats, and a member of a set of listed data packet formats is employed alternatively to a member in the set of received adjusted resources by the integrated circuit to carry out a communication.

42. The apparatus of claim 39, wherein a first member of the listed set of data packet format is compatible with a second member of said set, and the first and second members are compatible members employed interchangeably by the integrated circuit.

43. The apparatus of claim 38, wherein the integrated circuit is further configured to facilitate resource adjustment, wherein the resource adjustment is at least a change from an N-step hybrid automated repeat request (HAQR) process to an M-step HARQ, with M greater than N and both natural numbers.

44. The apparatus of claim 38, wherein the integrated circuit is configured to decode multiple data packet formats.

45. The apparatus of claim 38, wherein the integrated circuit is configured to assign a frequency reuse pattern, and a bandwidth.

46. The apparatus of claim 38, wherein the integrated circuit is configured to assign one or more resources selected from a group consisting of a power output level and a power spectral density.

47. The apparatus of claim 38, wherein the integrated circuit is configured to schedule a set of frequency distributed subcarriers or frequency localized subcarriers for communication.

48. The apparatus of claim 38, wherein the apparatus is integrated with an access point.

49. A method used in a wireless communication system, comprising:
    scheduling a first set of communication resources at an access point;
    receiving a second set of communication resources in response to the first set of scheduled communication resources, wherein the second set of communication resources are based on a difference in pilot signal strength between a serving sector and a dominant non-serving sector; and
    determining whether to re-schedule the first set of communications according to the received second set of resources.

50. The method of claim 49, further comprising re-scheduling the first set of resources according to the second set of resources, if a determination to re-schedule is made.

51. The method of claim 49, further comprising suspending a transmission when a determination not to reschedule is made.

52. The method of claim 49, wherein the scheduling a first set of communication resources includes scheduling one or more resources selected from the group consisting of a packet format, a bandwidth, a frequency re-use pattern, a process order of a hybrid automated repeat request, a power, and a power spectral density.

53. The method of claim 49, wherein the re-scheduling the first set of resources includes assigning a data packet format from a set of multiple data packet formats.

54. The method of claim 49, wherein the re-scheduling the first set of resources includes assigning an M-step hybrid automated repeat request (HAQR) process, wherein the M-step process is longer that a first scheduled HARQ process.

55. The method of claim 49, wherein the access terminal has reverse link data communications with the serving sector, forward link data communications with the dominant non-serving sector, and no reverse link data communications with the dominant non-serving sector.

56. A non-transitory computer-readable medium, comprising:
    code for causing a computer to assign a first set of resources for communicating wirelessly; and
    code for causing a computer to re-assign the first set of resources in response to a received communication conveying that the first set of communication resources mismatches a set of projected resources, wherein the received communication is based on a difference in pilot signal strength between a serving sector and a dominant non-serving sector.

57. The computer-readable medium of claim 56, wherein the computer-readable medium is integrated with an access point.

58. An electronic device configured to:
    schedule a first set of communication resources at an access point;
    receive a second set of communication resources in response to the first set of scheduled communication resources, wherein the second set of communication resources are based on a difference in pilot signal strength between a serving sector and a dominant non-serving sector; and
    determine whether to re-schedule the first set of communications according to the received second set of resources.

* * * * *